(12) United States Patent
Ohgose

(10) Patent No.: US 6,237,012 B1
(45) Date of Patent: May 22, 2001

(54) ORTHOGONAL TRANSFORM APPARATUS

(75) Inventor: Hideyuki Ohgose, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/188,745

(22) Filed: Nov. 9, 1998

(30) Foreign Application Priority Data

Nov. 7, 1997 (JP) .................................................... 9-305689

(51) Int. Cl.[7] ....................................................... G06F 17/14
(52) U.S. Cl. ........................... 708/401; 708/402; 708/405
(58) Field of Search .................................. 708/400–402, 708/405

(56) References Cited

U.S. PATENT DOCUMENTS

| | | | |
|---|---|---|---|
| 5,649,077 | * 7/1997 | On et al. | 708/401 |
| 5,724,278 | * 3/1998 | Ohgose et al. | 708/401 |
| 5,825,676 | * 10/1998 | Nozawa | 708/401 |
| 5,835,915 | * 11/1998 | Cho | 708/401 |

FOREIGN PATENT DOCUMENTS

| | | |
|---|---|---|
| 200362 | 7/1992 | (JP) . |
| 143723 | 6/1993 | (JP) . |

\* cited by examiner

*Primary Examiner*—Tan V. Mai
(74) *Attorney, Agent, or Firm*—Ratner & Prestia

(57) ABSTRACT

An orthogonal transform apparatus has:
orthogonal transform circuit for performing n-dimensional s-order (n and s are natural numbers) orthogonal transform, modified-information control circuit for performing control in accordance with modified information for outputting n-dimensional m-order data as n-dimensional p-order data (m and p are natural numbers), and rearrangement circuit for performing the following in accordance with the control by said modified-information control circuit:

(1) m-p data values from the high-order side out of m-order input data values are set to 0 when m is equal to s and m is larger than p, p-m data values are added to the high-order side among m-order input data values to rearrange the data values when m is smaller than p, or data values are left as they are when m is equal to p;

(2) the data values in said Item (1) are rearranged after discarding m-s data values from the high-order side of said m-order input data values before rearranging the data values in said Item (1) when m is larger than s; and (3) the data values in said Item (1) are rearranged after adding s-m 0 data values to the high-order side of said m-order input data values before rearranging the data values in said Item (1) when m is smaller than s; wherein said orthogonal transform circuit performs orthogonal transform for the n-dimensional s-order data values rearranged by said rearrangement circuit.

27 Claims, 11 Drawing Sheets

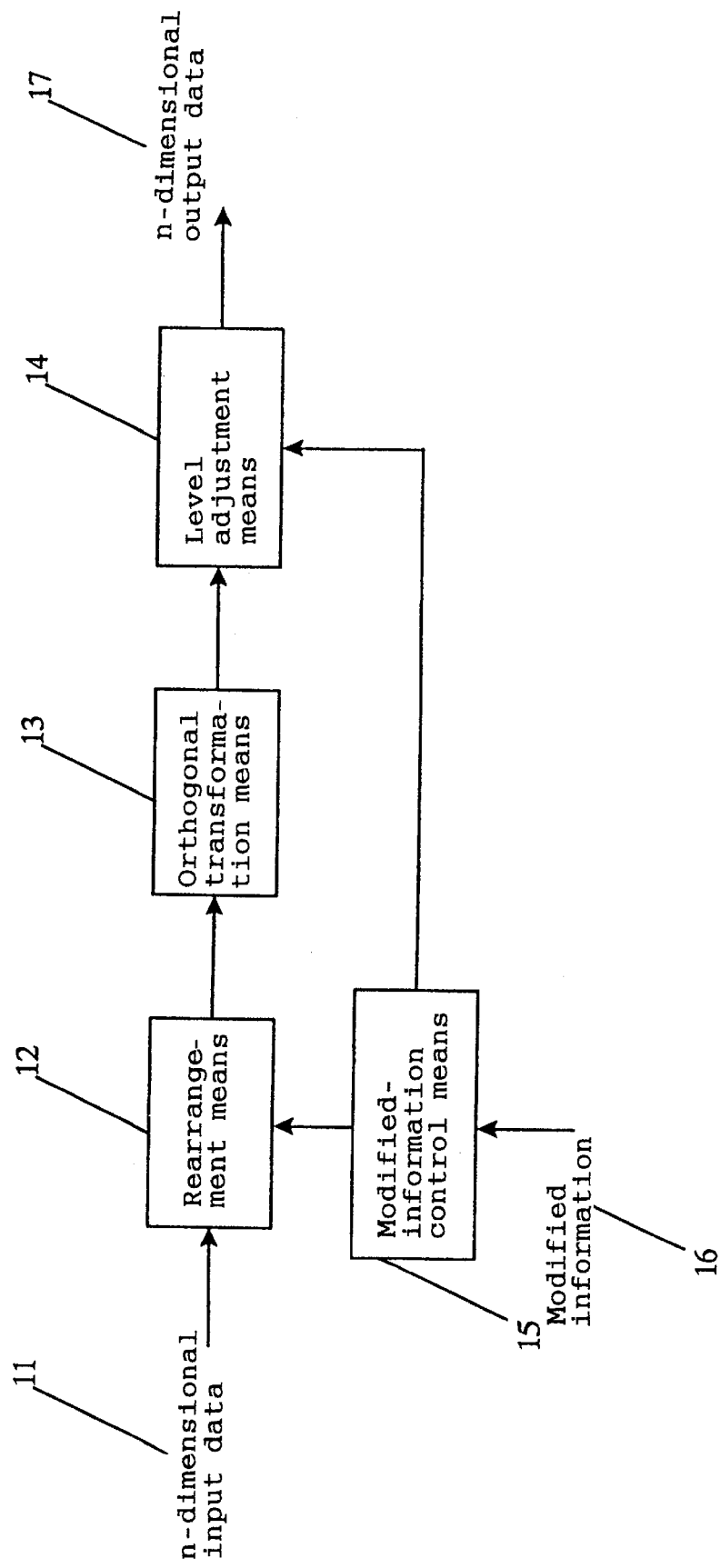

Fig. 4(a)
Fig. 4(b)
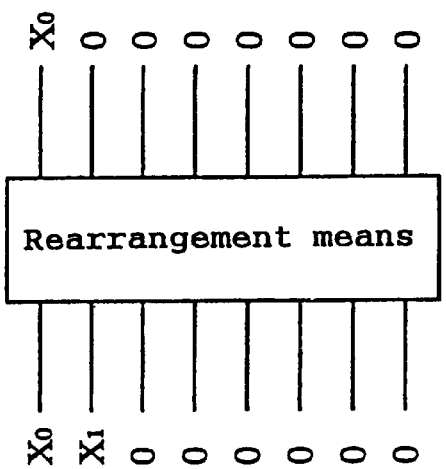
Fig. 4(d)
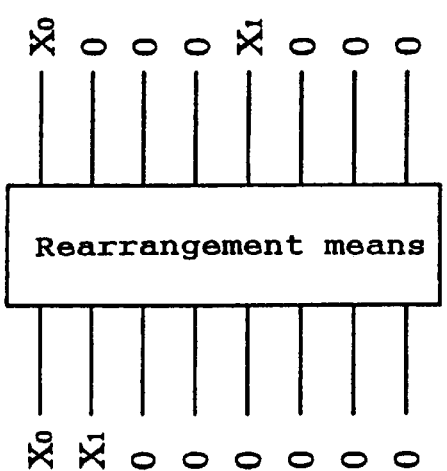
Fig. 4(c)

ORTHOGONAL TRANSFORM APPARATUS

BACKGROUND OF THE INVENTION

1. Field of the Invention

The present invention relates to an orthogonal transform apparatus and method capable of enlarging and shrinking an image and orthogonally transforming input data in orthogonal transform of an image such as dynamic-image data.

2. Related Art of the Invention

The method disclosed in the official gazette of Japanese Patent Laid-Open No. 143723/1993 has been known so far as a method for shrinking a dynamic image. Moreover, the method disclosed in the official gazette of Japanese Patent Application No. 200362/1992 has been known so far as a method for enlarging a dynamic image. The enlarging and shrinking methods disclosed in these official gazettes purpose the input of an 8-row 8-column discrete cosine transform (DCT) coefficient.

FIG. 9 shows a conventional inverse-DCT apparatus for shrinking an image size. In FIG. 9, a changeover switch 95 has input terminals a, b, and c. The input terminal. is connected to the output of an 8×8 inverse-DCT circuit 92, the input terminal b is connected to that of 4×4 inverse-DCT circuit 93, and the input terminal c is connected to that of a 2×2 inverse-DCT circuit 94. Any one of these input terminals is selected and set in accordance with a control signal supplied from a control circuit 97 to output pixel data 98. The 8×8 inverse-DCT circuit 92 is a circuit for inverse-DCT-processing an 8×8 DCT coefficient 91. The 4×4 inverse-DCT circuit 93 is a circuit for inverse-DCT-processing a 4×4 DCT coefficient to reduce the length and width of an image size to ½ respectively and the 2×2 inverse-DCT circuit 94 is a circuit for inverse-DCT-processing a 2×2 DCT coefficient and reducing an image size to ¼. In this case, when an input is the 8×8 DCT coefficient 91, the 8×8 DCT coefficient 91 is directly input to the 8×8 inverse-DCT circuit 92 and inverse-DCT-processed to become 8×8 pixel data. To shrink an image to ½, the 4×4 DCT coefficient of the low-band component of the 8×8 DCT coefficient 91 is input to the 4×4 inverse-DCT circuit 93 and inverse-DCT-processed to become 4×4 pixel data and a ½-size image. To shrink an image to ¼, the 2×2 DCT coefficient of the low-band component of the 8×8 DCT coefficient 91 is input to the 2×2 inverse-DCT circuit 94 and inverse-DCT-processed to become 2×2 pixel data and a ¼-size image.

FIG. 10 shows a conventional inverse-DCT apparatus for enlarging an image size. In FIG. 10, enlargement-block generation means 102 generates a new DCT coefficient of N1×N2 size (N1 and N2 are integers larger than 8) by using the 8×8 DCT coefficient 101 as a low-band component and a high-band component as 0. By inverse-DCT-processing the new N1×N2 DCT coefficient by inverse-DCT means 103, N1×N2 pixel data 104 is generated and an image enlarged by N1⅛ times in the longitudinal direction and by N2⅛ times in the cross direction.

To realize the orthogonal transform apparatus capable of enlarging and shrinking an image with hardware, a inverse-DCT circuit for enlargement and a inverse-DCT circuit for shrinkion are necessary and moreover, an n-order inverse-DCT circuit (n is a natural number) is necessary. Thereby, because n inverse-DCT circuits are necessary, it is necessary to newly design an n-order inverse-DCT circuit for each degree. Moreover, a problem occurs that a circuit size increases because n inverse-DCT circuits are combined.

SUMMARY OF THE INVENTION

The present invention is made to solve the conventional problem that a circuit size increases to realize an orthogonal transform apparatus capable of enlarging and shrinking an image with hardware and its object is to provide an orthogonal transform apparatus whose circuit size is small.

It is another object of the present invention to provide an orthogonal transform apparatus capable of enlarging and shrinking an image by using an orthogonal transform apparatus used at present without newly requiring an orthogonal transform apparatus having a different degree.

An orthogonal transform apparatus of the present invention comprises;

orthogonal transform means for performing n-dimensional s-order (n and s are natural numbers) orthogonal transform, modified-information control means for performing control in accordance with modified information for outputting n-dimensional m-order data as n-dimensional p-order data (m and p are natural numbers), and rearrangement means for performing the following in accordance with the control by said modified-information control means:

(1) m-p data values from the high-order side out of m-order input data values are set to 0 when m is equal to s and m is larger than p, p-m data values are added to the high-order side among m-order input data values to rearrange the data values when m is smaller than p, or data values are left as they are when m is equal to p;

(2) the data values in said Item (1) are rearranged after discarding m-s data values from the high-order side of said m-order input data values before rearranging the data values in said Item (1) when m is larger than s; and (3) the data values in said Item (1) are rearranged after adding s-m 0 data values to the high-order side of said m-order input data values before rearranging the data values in said Item (1) when m is smaller than s; wherein said orthogonal transform means performs orthogonal transform for the n-dimensional s-order data values rearranged by said rearrangement means.

An orthogonal transform apparatus of the present invention comprises orthogonal transform means for performing the orthogonal transform of n-dimensional s-order (n and s are natural numbers), modified-information control means for performing control in accordance with the modified information for outputting n-dimensional m-order data as n-dimensional p-order data (m and p are natural numbers), and rearrangement means for performing the following in accordance with the control by said modified-information control means:

(1) m-p data values from the high-order side out of m-order input data values are set to 0 when m is equal to s and m is larger than p, p-m data values are added to the high-order side among m-order input data values to rearrange the data values when m is smaller than p, or data values are left as they are when m is equal to p;

(2) the data values in said Item (1) are rearranged after discarding m-s data values from the high-order side of said m-order input data values before rearranging the data values in said Item (1) when m is larger than s; and (3) the data values in said Item (1) are rearranged after adding s-m 0 data values to the high-order side of said m-order input data values before rearranging the data values in said Item (1) when m is smaller than s; wherein said orthogonal transform means performs orthogonal transform for the n-dimensional s-order data values rearranged by said rearrangement means and moreover, performs level adjustment for the data values.

An orthogonal transform apparatus of the present invention for two-dimensionally orthogonally transforming two-dimensional data of m1 rows and m2 columns into two-dimensional data of p1 rows and p2 columns, comprises first orthogonal transform means for performing one-dimensional s1-order orthogonal transform, second orthogonal transform means for performing one-dimensional s2-order orthogonal transform, modified-information control means for performing control in accordance with modified information, and first rearrangement means for performing the following in accordance with the control by said modified-information control means:

(1) m1–p1 data values from the high-order side out of m1-order input data values are set to 0 when m1 is equal to s1 and m1 is larger than p1, p1–m1 data values are added to the high-order side among m1-order input data values to rearrange the data values when m1 is smaller than p1, or data values are left as they are when m1 is equal to p1;

(2) the data values in said Item (1) are rearranged after discarding m1–s1 data values from the high-order side of said m1-order input data values before rearranging the data values in said Item (1) when m1 is larger than s1; and (3) the data values in said Item (1) are rearranged after adding s1–m1 0 data values to the high-order side of said m1-order input data values before rearranging the data values in said Item (1) when m1 is smaller than s1; further comprising transposition means for holding data of s1 rows and m2 columns output from said first orthogonal transform means and second rearrangement means for performing the following:

(4) m2–p2 data values from the high-order side out of m2-order input data values are set to 0 when m2 is equal to s2 and m2 is larger than p2, p2–m2 data values are added to the high-order side among m2-order input data values to rearrange the data values when m2 is smaller than p2, or data values are left as they are when m2 is equal to p2;

(5) the data values in said Item (4) are rearranged after discarding m2–s2 data values from the high-order side of said m2-order input data values before rearranging the data values in said Item (4) when m2 is larger than s2; and (6) the data values in said Item (4) are rearranged after adding s2–m2 0 data values to the high-order side of said m2-order input data values before rearranging the data values in said Item (4) when m2 is smaller than s2; and further comprising timing control means for controlling the data input/output timing of each means; wherein said first and second orthogonal transform means apply orthogonal transform to the two-dimensional data of s1 rows and s2 columns rearranged by said first and second rearrangement means.

An orthogonal transform apparatus of the present invention for two-dimensionally orthogonally transforming two-dimensional data of m1 rows and m2 columns into two-dimensional data of p1 rows and p2 columns comprises: orthogonal transform means for performing one-dimensional s-order orthogonal transform, transposition means for holding the data output from said orthogonal transform means and transposing the data when output, selection means for outputting the output data of said orthogonal transform means or selectively supplying the output data to said transposition means, modified-information control means for performing control in accordance with modified information, and rearrangement means for performing the following in accordance with the control by said modified-information control means by setting m1 to m when the data to be rearranged is two-dimensional input data or setting m2 to m when the data to be rearranged is the output data of said transposition means:

(1) m–p data values from the high-order side out of m-order input data values are set to 0 when m is equal to s and m is larger than p, p–m data values are added to the high-order side among m-order input data values to rearrange the data values when m is smaller than p, or data values are left as they are when m is equal to p;

(2) the data values in said Item (1) are rearranged after discarding m–s data values from the high-order side of said m-order input data values before rearranging the data values in said Item (1) when m is larger than s; and (3) the data values in said Item (1) are rearranged after adding s–m 0 data values to the high-order side of said m-order input data values before rearranging the data values in said Item (1) when m is smaller than s; and further comprising timing control means for controlling the data input/output timing of each means; wherein said orthogonal transform means applies orthogonal transform to the one-dimensional s-order data values rearranged by said rearrangement means.

BRIEF DESCRIPTION OF THE DRAWINGS

FIG. 1 is a block diagram showing the orthogonal transform apparatus of embodiment 1 of the present invention;

FIGS. 4(a) to 4(d) are block diagrams showing rearrangement of input data of the present invention;

DETAILED DESCRIPTION OF PREFERRED EMBODIMENTS

Figure 2B:
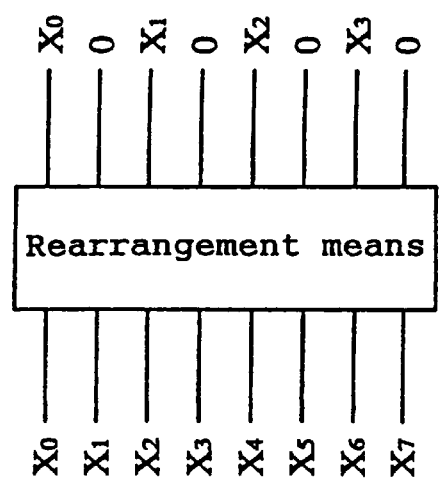
FIGS. 2(a) to 2(d) are block diagrams showing rearrangement of input data of the present invention.
Figure 2D:
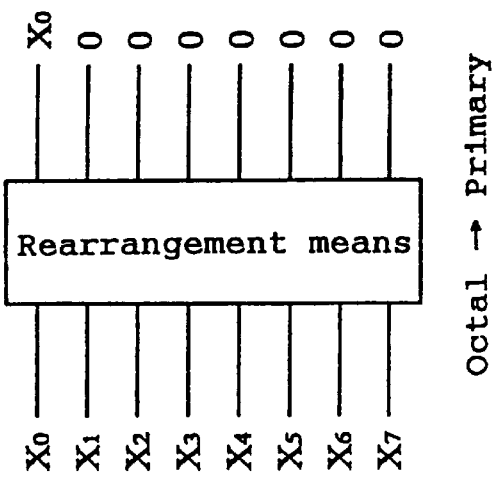

Embodiments of the present invention are described below by referring to the accompanying drawings.

(Embodiment 1)

FIG. 1 is a block diagram showing the structure of the orthogonal transform apparatus for performing n-dimensional orthogonal transform (n is a natural number). In FIG. 1, symbol 11 denotes n-dimensional input data, 12 denotes rearrangement means, 13 denotes orthogonal transform means, 14 denotes level adjustment means, 15 denotes modified-information control means, 16 denotes modified information, and 17 denotes n-dimensional output data. Operations of the orthogonal transform apparatus are described below.

In this case, to simpfy the description, a case in which the orthogonal transform means 13 performs one-dimensional eight-order inverse discrete cosine transform (inverse DCT) and the degree of input data is $2^k$ (k is an integer of 0 to 3) is described as an example.

First, the one-dimensional input data 11 is rearranged by rearrangement means 12 in accordance with control information supplied from the modified-information control means 15 and the data unnecessary for orthogonal transform is set to 0. For the rearrangement method in the above case, FIGS. 2, 3, 4, and 5 show the cases in which an input is octal data, quaternary data, secondary data, and primary data and an output is octal data, quaternary data, secondary data, and primary data. Octal, quaternary, secondary, or primary one-dimensional output data 17 of is obtained by applying one-dimensional 8-order inverse DCT to rearranged data by the orthogonal transform means 13 and level-adjusting transformed data by the level adjustment means 14. Moreover, the modified-information control means 15 determines the rearrangement pattern of the rearrangement means 12 and the level adjustment value of the level adjustment means 14 in accordance with the degree of the one-dimensional input data 11, the degree of the one-dimensional output data 17, and modified information 16 which is the maximum degree capable of being orthogonally transformed in the orthogonal transform means 13.

In this case, the reason why octal, quaternary, secondary, or primary output data is obtained by using one-dimensional 8-order inverse DCT from octal, quaternary, secondary, or primary input data and level adjustment are described below by using the following Equations 1, 2, 3, 4, 5, and 6.

$$\sqrt{\frac{2}{N}} k_n \cos\left(\frac{(2m+1)n}{2N}\pi\right) \quad \begin{pmatrix} m,n = 0, 1, \cdots, N \\ k_n = \begin{cases} 1 & \cdots n \neq 0 \\ \frac{1}{\sqrt{2}} & \cdots n = 0 \end{cases} \end{pmatrix} \quad \text{[Equation 1]}$$

Equation 1 shows the general expression of a inverse-DCT coefficient. In this expression, N denotes a degree. In accordance with the general expression, by assuming $C_n = \cos(n\pi/16)$, an 8-order inverse-DCT coefficient is shown in Equation 2, a 4-order inverse DCT coefficient is shown in Equation 3, a 2-order inverse DCT coefficient is shown in Equation 4, and a primary inverse-DCT coefficient is shown in Equation 5.

$$\frac{1}{2}\begin{bmatrix} a_{00} & a_{01} & a_{02} & a_{03} & a_{04} & a_{05} & a_{06} & a_{07} \\ a_{10} & a_{11} & a_{12} & a_{13} & a_{14} & a_{15} & a_{16} & a_{17} \\ a_{20} & a_{21} & a_{22} & a_{23} & a_{24} & a_{25} & a_{26} & a_{27} \\ a_{30} & a_{31} & a_{32} & a_{33} & a_{34} & a_{35} & a_{36} & a_{37} \\ a_{40} & a_{41} & a_{42} & a_{43} & a_{44} & a_{45} & a_{46} & a_{47} \\ a_{50} & a_{51} & a_{52} & a_{53} & a_{54} & a_{55} & a_{56} & a_{57} \\ a_{60} & a_{61} & a_{62} & a_{63} & a_{64} & a_{65} & a_{66} & a_{67} \\ a_{70} & a_{71} & a_{72} & a_{73} & a_{74} & a_{75} & a_{76} & a_{77} \end{bmatrix} = \quad \text{[Equation 2]}$$

$$\frac{1}{2}\begin{bmatrix} C_4 & C_1 & C_2 & C_3 & C_4 & C_5 & C_6 & C_7 \\ C_4 & C_3 & C_6 & -C_7 & -C_4 & -C_1 & -C_2 & -C_5 \\ C_4 & C_5 & -C_6 & -C_1 & -C_4 & C_7 & C_2 & C_3 \\ C_4 & C_7 & -C_2 & -C_5 & C_4 & C_3 & -C_6 & -C_1 \\ C_4 & -C_7 & -C_2 & C_5 & C_4 & -C_3 & -C_6 & C_1 \\ C_4 & -C_5 & -C_6 & C_1 & -C_4 & -C_7 & C_2 & -C_3 \\ C_4 & -C_3 & C_6 & C_7 & -C_4 & C_1 & -C_2 & C_5 \\ C_4 & -C_1 & C_2 & -C_3 & C_4 & -C_5 & C_6 & -C_7 \end{bmatrix}$$

$$\frac{1}{\sqrt{2}}\begin{bmatrix} b_{00} & b_{01} & b_{02} & b_{03} \\ b_{10} & b_{11} & b_{12} & b_{13} \\ b_{20} & b_{21} & b_{22} & b_{23} \\ b_{30} & b_{31} & b_{32} & b_{33} \end{bmatrix} = \frac{1}{\sqrt{2}}\begin{bmatrix} C_4 & C_2 & C_4 & C_6 \\ C_4 & C_6 & -C_4 & -C_2 \\ C_4 & -C_6 & -C_4 & C_2 \\ C_4 & -C_2 & C_4 & -C_6 \end{bmatrix} \quad \text{[Equation 3]}$$

$$\begin{bmatrix} c_{00} & c_{01} \\ c_{10} & c_{11} \end{bmatrix} = \begin{bmatrix} C_4 & C_4 \\ C_4 & -C_4 \end{bmatrix} \quad \text{[Equation 4]}$$

$$[d_{00}] = \sqrt{2}\,[C_4] \quad \text{[Equation 5]}$$

First, it is considered to obtain quaternary output data from quaternary input data by using 8-order inverse DCT. In this case, as the result of comparing the 8-order inverse-DCT coefficient (Equation 2) with the 4-order inverse DCT coefficient (Equation 3), it is found that cosine coefficients a00 and b00, a02 and b01, a04 and b02, a06 and b03, a10 and b10, a12 and b11, a14 and b12, a16 and b13, a20 and b20, a22 and b21, a24 and b22, a26 and b23, a30 and b30, a32 and b31, a34 and b32, and a36 and b33 are respectively equal to each other. Therefore, 8-order inverse DCT is performed by rearranging quaternary input data as shown in FIG. 3(b). This is shown in Equation 6.

$$\begin{bmatrix} y_0 \\ y_1 \\ y_2 \\ y_3 \\ y_4 \\ y_5 \\ y_6 \\ y_7 \end{bmatrix} = \quad \text{[Equation 6]}$$

$$\frac{1}{2}\begin{bmatrix} C_4 & C_1 & C_2 & C_3 & C_4 & C_5 & C_6 & C_7 \\ C_4 & C_3 & C_6 & -C_7 & -C_4 & -C_1 & -C_2 & -C_5 \\ C_4 & C_5 & -C_6 & -C_1 & -C_4 & C_7 & C_2 & C_3 \\ C_4 & C_7 & -C_2 & -C_5 & C_4 & C_3 & -C_6 & -C_1 \\ C_4 & -C_7 & -C_2 & C_5 & C_4 & -C_3 & -C_6 & C_1 \\ C_4 & -C_5 & -C_6 & C_1 & -C_4 & -C_7 & C_2 & -C_3 \\ C_4 & -C_3 & C_6 & C_7 & -C_4 & C_1 & -C_2 & C_5 \\ C_4 & -C_1 & C_2 & -C_3 & C_4 & -C_5 & C_6 & -C_7 \end{bmatrix}\begin{bmatrix} x_0 \\ 0 \\ x_1 \\ 0 \\ x_2 \\ 0 \\ x_3 \\ 0 \end{bmatrix}$$

By using rearranged data as an input and thereby performing 8-order inverse DCT, outputs of y0, y1, y2, y3, y4, y5, y6, and y7 are obtained. In these outputs, a portion coinciding with the inverse-DCT coefficient is as described above. Therefore, y0, y1, y2, and y3 serve as effective output data. Then, in the case of level adjustment, as shown in Equation 3, every quaternary input data value is multiplied by $1/\sqrt{2}$ but every input data is multiplied by ½ in the case of the 8-order inverse DCT. By computing the quaternary input data through the 8-order inverse DCT, it is found that every output data value is multiplied by $1/\sqrt{2}$ compared with the case in which 4-order inverse DCT. In this case, to adjust a level, every data output from the orthogonal transform means 13 for performing one-dimensional 8-order inverse DCT is multiplied by $\sqrt{2}$. Thereby, the same result as the case of using 4-order inverse DCT can be obtained.

Then, to obtain quaternary output data from octal input data, inverse DCT is performed by using low-order four data values of octal input data. In this case, input data values are rearranged as shown in FIG. 2(b) to perform the same rearrangement as the case of obtaining quaternary output data from the above quaternary input data. It is unnecessary to perform level adjustment after performing inverse DCT because input data is octal data.

Figure 3A:
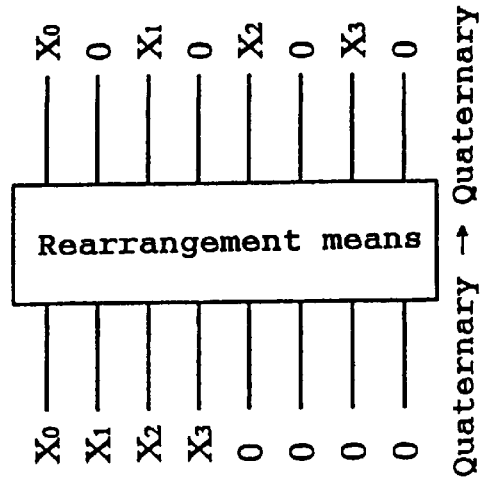
FIGS. 3(a) to 3(d) are block diagrams showing rearrangement of input data of the present invention.
Figure 3B:
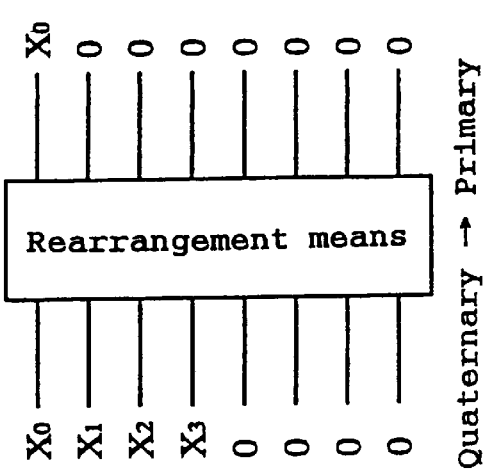
Figure 3C:
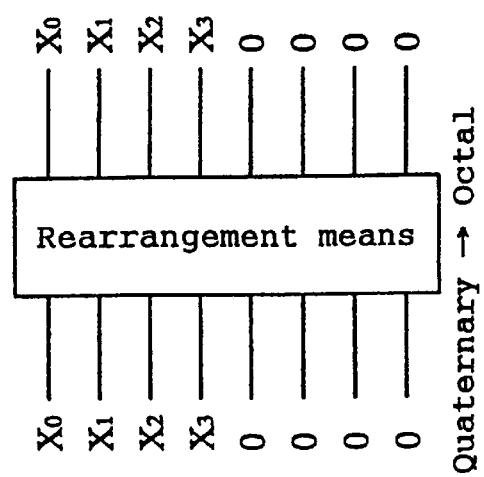
Figure 3D:
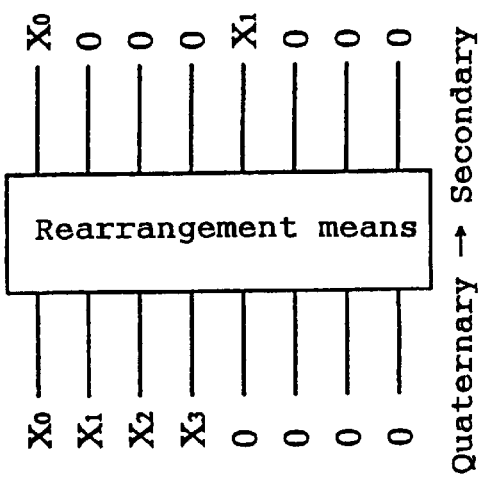
Figure 5B:
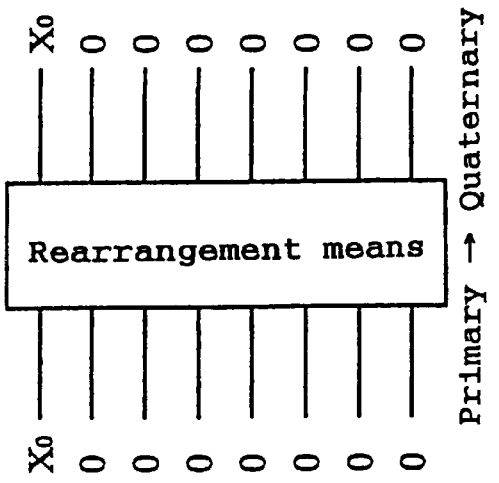
FIGS. 5(a) to 5(d) are block diagrams showing rearrangement of input data of the present invention.
Figure 5D:
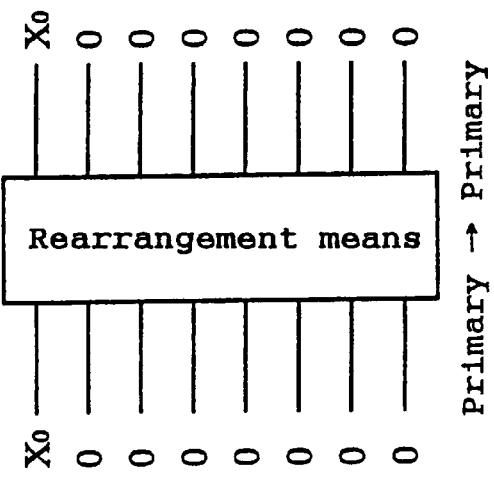
Figure 5A:
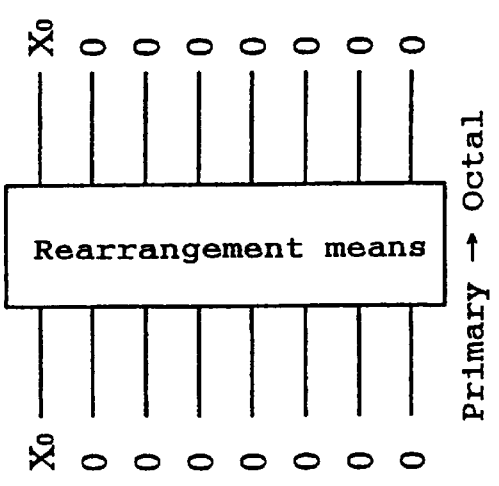
Figure 5C:
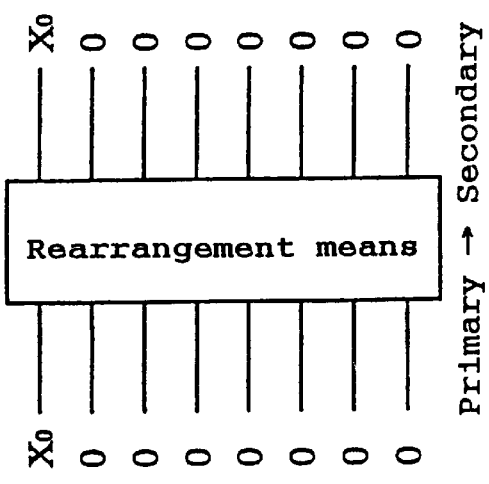

Then, to obtain octal output data from quaternary input data as shown in FIG. 3(a), inverse DCT is performed by assuming the quaternary input data as low-order data and high-order data as 0 and thereby rearranging the quaternary input data. For level adjustment, every output data value is multiplied by $\sqrt{2}$ similarly to the case of obtaining quaternary output data from quaternary input data because input data is quaternary data.

Cases of octal input data and quaternary input data are described above. The same is true for the case of secondary input data and primary input data in accordance with two expressions Equation 3 and Equation 4. Moreover, Table 1 shows level-adjustment values when input data is octal, quaternary, secondary, and primary and output data is octal, quaternary, secondary, and primary by summarizing them through 8-order inverse DCT.

TABLE 1

|  | Output | | | |
| --- | --- | --- | --- | --- |
| Input | Octal | Quaternary | Secondary | Primary |
| Octal | 1 | 1 | 1 | 1 |
| Quaternary | $\sqrt{2}$ | $\sqrt{2}$ | $\sqrt{2}$ | $\sqrt{2}$ |
| Secondary | 2 | 2 | 2 | 2 |
| Primary | $2\sqrt{2}$ | $2\sqrt{2}$ | $2\sqrt{2}$ | $2\sqrt{2}$ |

One-dimensional 8-order inverse DCT is described above as an example. Moreover, in the case of two-dimensional 8-order inverse DCT or higher, it is possible to form a structure by applying the same rearrangement as the above mentioned to each dimension of input data and applying level adjustment to data after inverse DCT every dimension.

Moreover, when the orthogonal transform means 13 constitutes one-dimensional inverse DCT at an optional degree, inverse DCT can be performed if input and output degrees are divisors of the maximum degree allowing inverse DCT to be performed. Furthermore, the same is true for the cases of two dimensions or more.

Furthermore, though the case in which the orthogonal transform means 13 performs inverse DCT is described as an example, it is possible to form a structure same as the case of inverse DCT by performing rearrangement for DCT, discrete sine transform, inverse discrete sine transform, discrete Fourier transform, or inverse discrete Fourier transform by the rearrangement means 12 in accordance with each transform and performing level adjustment by the level adjustment means 14 in accordance with each transform. Furthermore, it is possible to form a structure by using a fast algorithm when performing each orthogonal transform.

Figure 11:
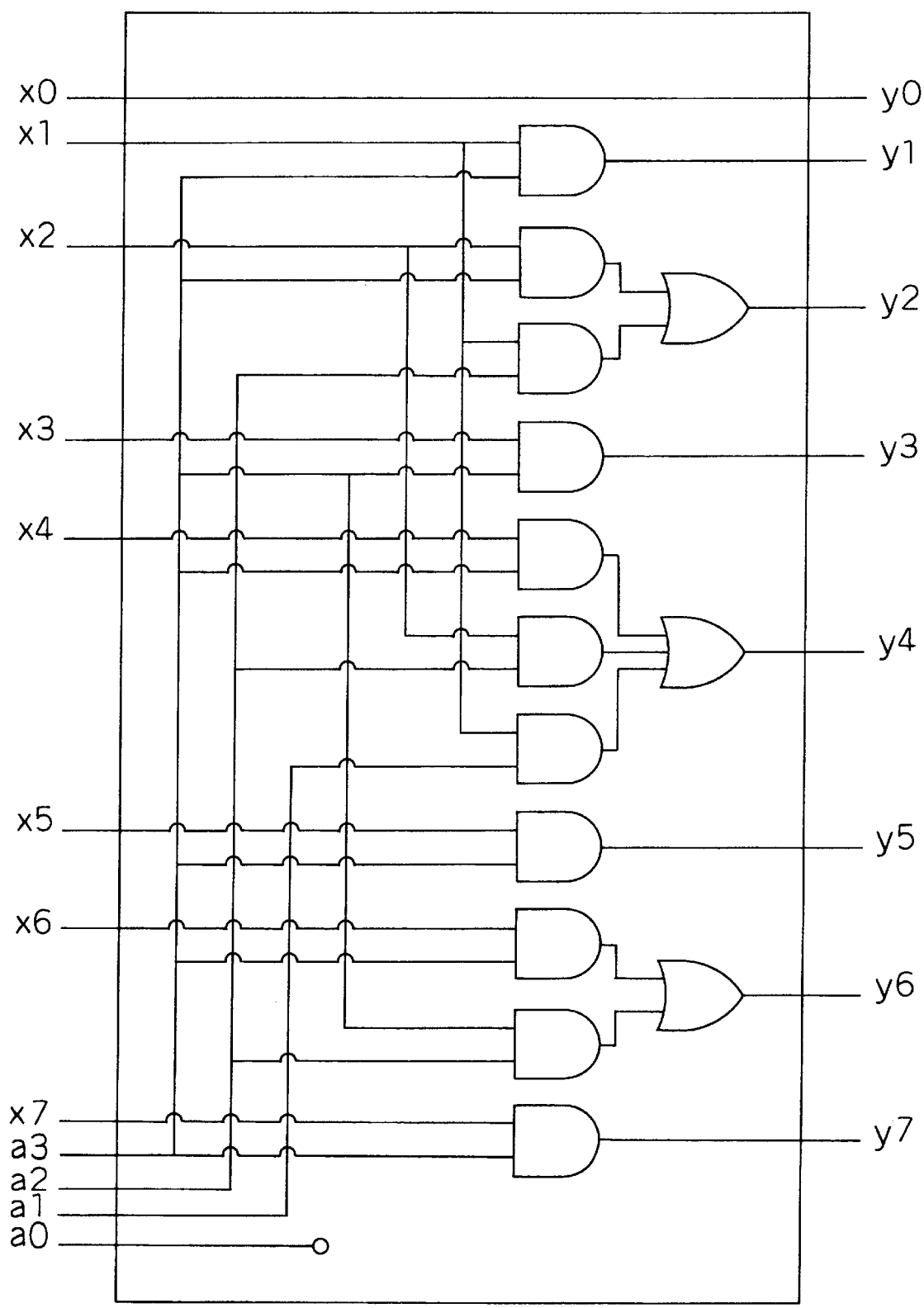
FIG. 11 shows a circuit of one example which rearranges for the example of FIG. 2.

Meanwhile FIG. 11 shows a circuit of one example which rearranges for the example of FIG. 2. In the case the meaning of each symbol is as the following table 2.

TABLE 2

| output | a3 | a2 | a1 | a0 |
| --- | --- | --- | --- | --- |
| Octal | 1 | 0 | 0 | 0 |
| Quaternary | 0 | 1 | 0 | 0 |
| Secondary | 0 | 0 | 1 | 0 |
| Primary | 0 | 0 | 0 | 1 |

In the circuit x0 to x7 are input data and y0 to y7 are data after rearrangment and z0 to a3 are 1 bit data shown in the Table 2.

(Embodiment 2)

Figure 6:
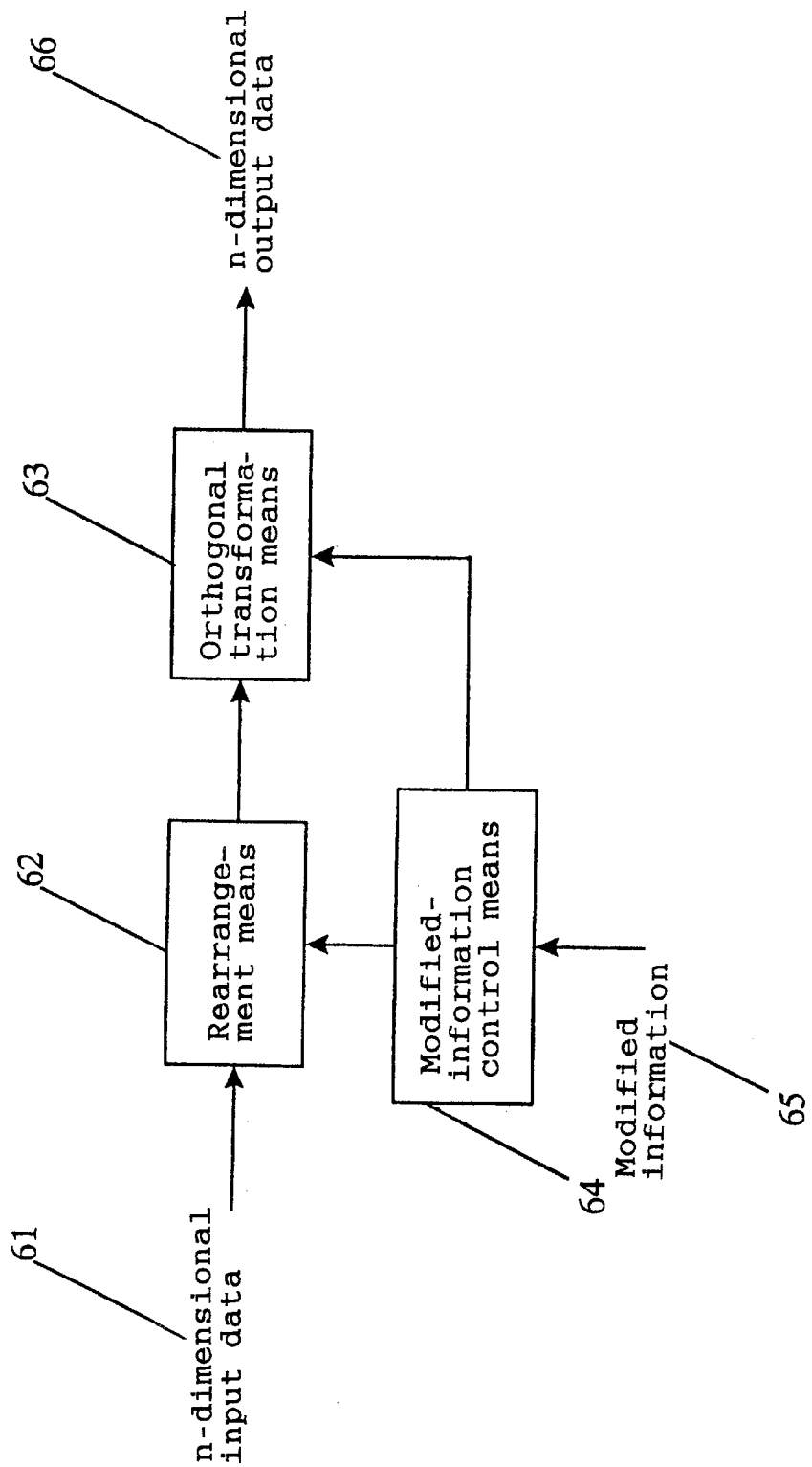
FIG. 6 is a block diagram showing the orthogonal transform apparatus of embodiment 2 of the present invention.

FIG. 6 is a block diagram showing the structure of the orthogonal transform apparatus of claim 5 for performing n-dimensional orthogonal transform (n is a natural number). In FIG. 6, symbol 61 denotes n-dimensional data, 62 denotes rearrangement means, 63 denotes orthogonal transform means, 64 denotes modified-information control means, 65 denotes modified information, and 66 denotes n-dimensional output data.

In this case, to simplify description, a case in which the orthogonal transform means 63 performs one-dimensional 8-order inverse DCT and the degree of input data is $2^k$ (k is an integer of 0 to 3) is described as an example.

First, the one-dimensional input data 61 is rearranged by the rearrangement means 62 in accordance with the control information supplied form the modified-information control means 64 to set the data unnecessary for orthogonal transform to 0. For the rearrangement method in the above case, FIGS. 2, 3, 4, and 5 show the cases in which input data is octal data, quaternary data, secondary data, or primary data and output data is octal data, quaternary data, secondary data, or primary data. By performing one-dimensional 8-order inverse DCT for rearranged data by orthogonal transform means 63 and moreover performing level adjustment (not illustrated) for the rearranged data, octal, quaternary, secondary, or primary one-dimensional output data 66 is obtained. Moreover, the modified-information control means 64 determines the rearrangement patter of the rearrangement means 62 and the level adjustment value of the orthogonal transform means 63 in accordance with the degree of the one-dimensional input data 61, degree of the one-dimensional output data 66, and the modified information 65 having the maximum degree which can be orthogonally transformed.

In this case, the orthogonal transform means 63 performs one-dimensional inverse DCT and level adjustment which are described below.

Inverse DCT is computed by repeating the multiply-accumulate operation between a cosine coefficient and input data and level adjustment is applied to every output data value by using values obtained from the relation between degrees of an input and output (Table 1). The level adjustment is performed by multiplying a level adjustment value and every output data value. Thereby, to perform two operations such as inverse DCT and level adjustment at the same time, a inverse DCT coefficient including a level adjustment value is previously prepared to perform one-dimensional inverse DCT by using a inverse DCT coefficient determined by the level adjustment value of modification control means 64. For example, to obtain quaternary output data from quaternary input data by using one-dimensional 8-order inverse DCT, it is necessary to multiply every output data value of inverse DCT by $\sqrt{2}$ as described above. However, by multiplying every coefficient of 8-order inverse DCT by $\sqrt{2}$, the same result can be obtained.

One-dimensional 8-order inverse DCT is described above as an example. Moreover, in the case of two dimensions or higher, it is possible to form a structure by applying the same rearrangement as described above to each dimension of input data and using a inverse DCT coefficient including a level adjustment value for each dimension.

Furthermore, when the orthogonal transform means 63 constitutes one-dimensional inverse DCT at an optional degree, it is possible to perform inverse DCT if input and output degrees are divisors of the maximum degree allowing inverse DCT to be performed. Furthermore, the same is true for cases of two dimensions or higher.

Furthermore, though the case in which the orthogonal transform means 63 performs inverse DCT is described as an example, it is possible to form the same structure as the case of inverse DCT by using an orthogonal transform coefficient including a level adjustment value according to each transform and thereby, performing rearrangement by the rearrangement means 62 for DCT, discrete sine transform, inverse discrete sine transform, discrete Fourier transform, or inverse discrete Fourier transform in accordance with each transform. Furthermore, to perform each orthogonal transform, it is possible to form a structure by using a fast algorithm.

(Embodiment 3)

Figure 7:
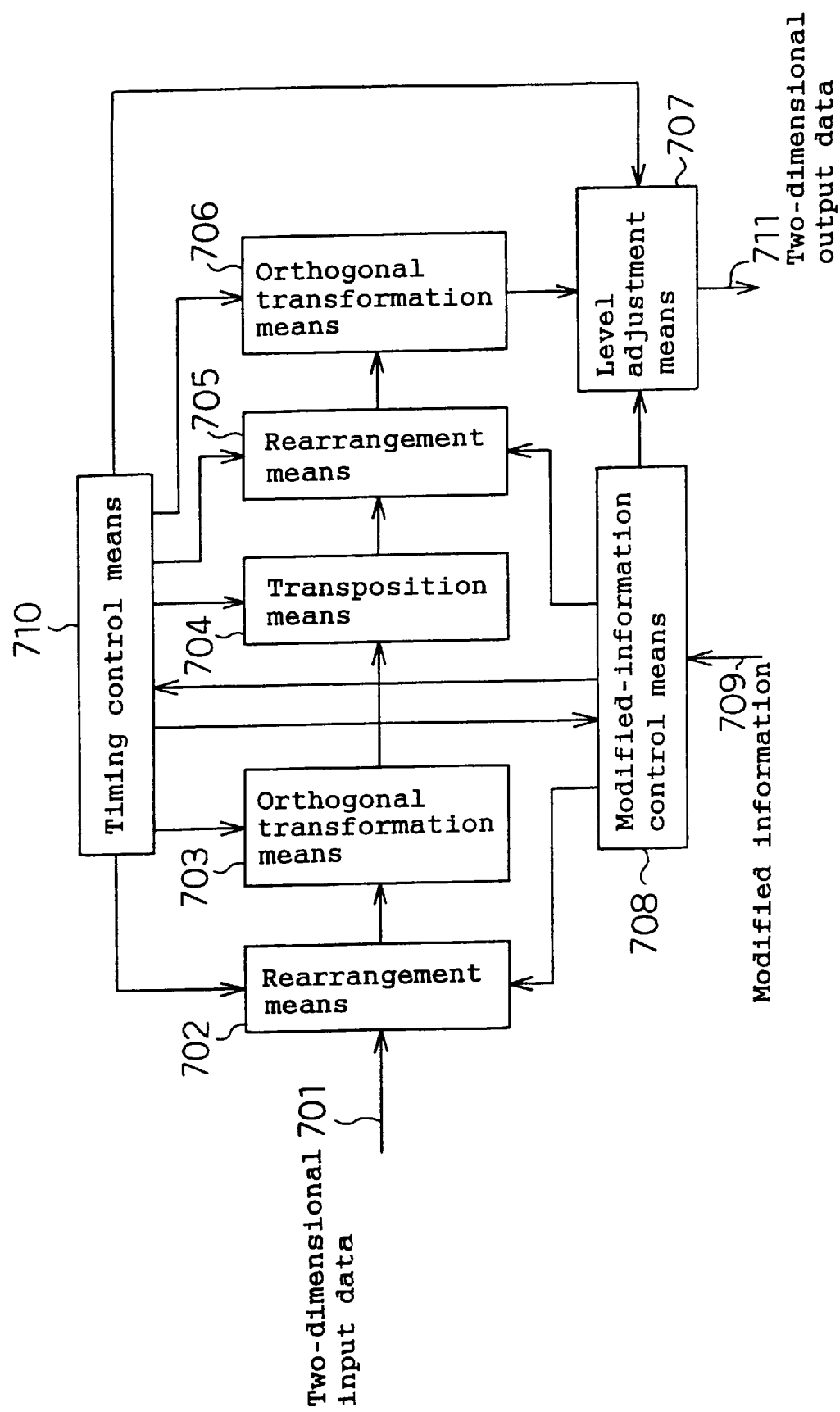
FIG. 7 is a block diagram showing the orthogonal transform apparatus of embodiment 3 of the present invention.

FIG. 7 is a block diagram showing the structure of the orthogonal transform apparatus of claim 9 for performing two-dimensional orthogonal transform. In FIG. 7, symbol 701 denotes two-dimensional input data, 702 denotes rearrangement means, 703 denotes orthogonal transform means, 704 denotes transposition means, 705 denotes rearrangement means, 706 denotes orthogonal transform means, 707 denotes level adjustment means, 708 denotes modified-information control means, 709 denotes modified information, 710 denotes timing control means, and 711 denotes two-dimensional output data. Operations of the orthogonal transform apparatus are described below.

Hereafter, to simplify description, a case is described in which the orthogonal transform means 703 and 706 perform one-dimensional 8-order inverse DCT and the two-dimensional input data 701 consists of $2^k$ rows and $2^l$ columns (each of k and l is an integer of 0 to 3).

First, data values in the row direction of the two-dimensional input data 701 are rearranged by the rearrangement means 702 in accordance with the control information supplied from the modified-information control means 708 to set the data unnecessary for orthogonal transform to 0. In this case, the data values to be rearranged are one-dimensional $2^l$-order data values that are rearranged in accordance with FIGS. 2, 3, 4, and 5. The orthogonal transform means 703 applies one-dimensional 8-order inverse DCT to the data values rearranged in the row direction and the transposition means 704 holds the result and transposes rows and columns of the result to output it. Data values in the row direction of the two-dimensional data whose rows and columns are transposed are rearranged by the rearrangement means 705 in accordance with the control information supplied from the modified-information control means 708 to set the data unnecessary for orthogonal transform to 0. In this case, the data to be rearranged is one-dimensional $2^k$-order data and rearranged in accordance with FIGS. 2, 3, 4, and 5. The orthogonal transform means 706 applies one-dimensional 8-order inverse DCT to the rearranged data and the level adjustment means 707 applies level adjustment to the rearranged data to obtain two-dimensional output data 711. Moreover, the modified-information control means 709 determines the rearrangement patterns of the rearrangement means 702 and 705, level adjustment value of the level adjustment means 711, control information to be supplied to the timing control means 710 in accordance with the degrees of the two-dimensional input data 701 and two-dimensional output data 711 and the modified information 709 having the maximum degree which can be orthogonally transformed by the orthogonal transform means 703 and 706. Moreover, the timing control means 710 controls the input/output timing of the data in each means.

Figure 2A:
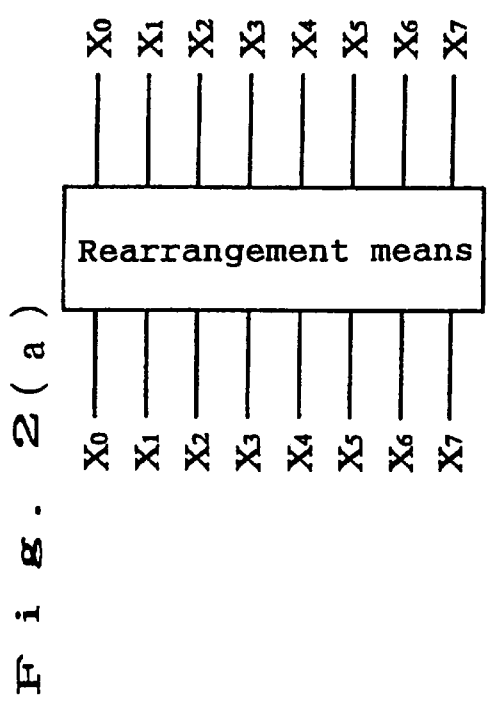
Figure 2C:
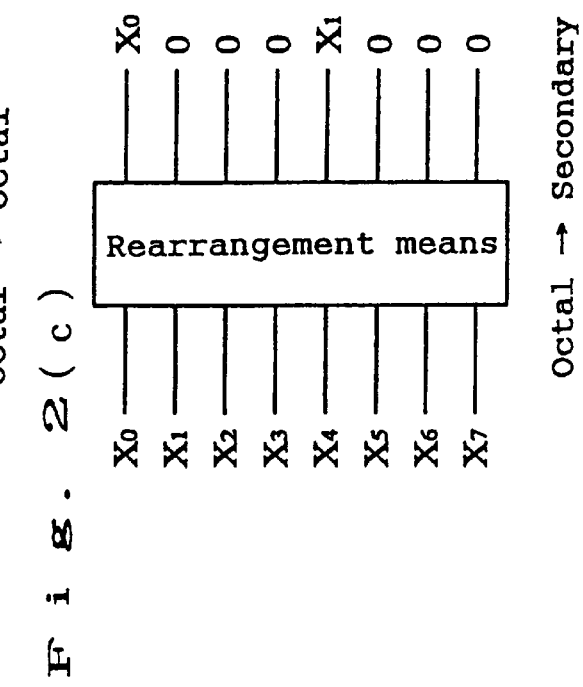

Hereafter, a case of obtaining 8-row 4-column output data from 8-row 4-column input data is described below as an example. In this case, row-directional data consists of quaternary data values which are rearranged by the rearrangement means 702 as shown in FIG. 3(b) and to which inversed DCT is applied by the orthogonal transform means 703. In this case, as shown in Table 1, it is necessary to multiply every data value output from the orthogonal transform means 703 by $\sqrt{2}$ in order to level-adjust the data value. In this case, however, level adjustment is not performed. The data not level-adjusted is transposed by the transposition means 704 and row-directional octal data values are rearranged by the rearrangement means 705 as shown in FIG. 2(a) to apply inverse DCT to the data values by the orthogonal transform means 706. In this case, it is unnecessary to perform level adjustment in accordance with Table 1 because inputs are octal. The level adjustment means 707 level-adjusts the data output from the orthogonal transform means 706 by $\sqrt{2}$ obtained by multiplying a level-adjustment value ($\sqrt{2}$-fold) necessary for the orthogonal transform means 703 by a level-adjustment value (one-fold) necessary for the orthogonal transform means 706. In this case, when considering the number of operation times, it is necessary to compute quaternary data eight times in the case of the orthogonal transform means 703. In the case of the orthogonal transform means 706, however, it is only necessary to compute octal data four times. The timing control means 710 controls the number of operation times through each means in accordance with the control information supplied from the modified-information control means 708.

The case of 8-row 4-column input data is described above. Moreover, in the case of other $2^k$-row $2^l$-column input data, it is possible to control the number of operation times through the timing control means by rearranging the data, applying inverse DCT to the data, and level-adjusting the data.

Moreover, it is possible to form a structure for performing inverse DCT and level adjustment by using a inverse DCT coefficient including a level adjustment value for the orthogonal transform means 703 and 706. Furthermore, when the orthogonal transform means 703 and 706 respectively constitute one-dimensional inverse DCT at an optional degree, it is possible to perform inverse DCT if degrees of the dimensions of input and output are divisors of the maximum degree allowing inverse DCT to be performed.

Furthermore, though the case in which orthogonal transform means 703 and 706 perform inverse DCT is described as an example, it is possible to form the same structure as the case of inverse DCT by performing rearrangement by the rearrangement means 702 and 705 in accordance with each transform, performing orthogonal transform by the orthogonal transform means 703 and 706, and performing level adjustment by the level adjustment means 707 in accordance with each transform for DCT, discrete sine transform, inverse discrete sine transform, discrete Fourier transform, or inverse discrete Fourier transform in accordance with each transform. Furthermore, when performing each orthogonal transform, it is possible to form a structure by using a fast algorithm.

(Embodiment 4)

Figure 8:
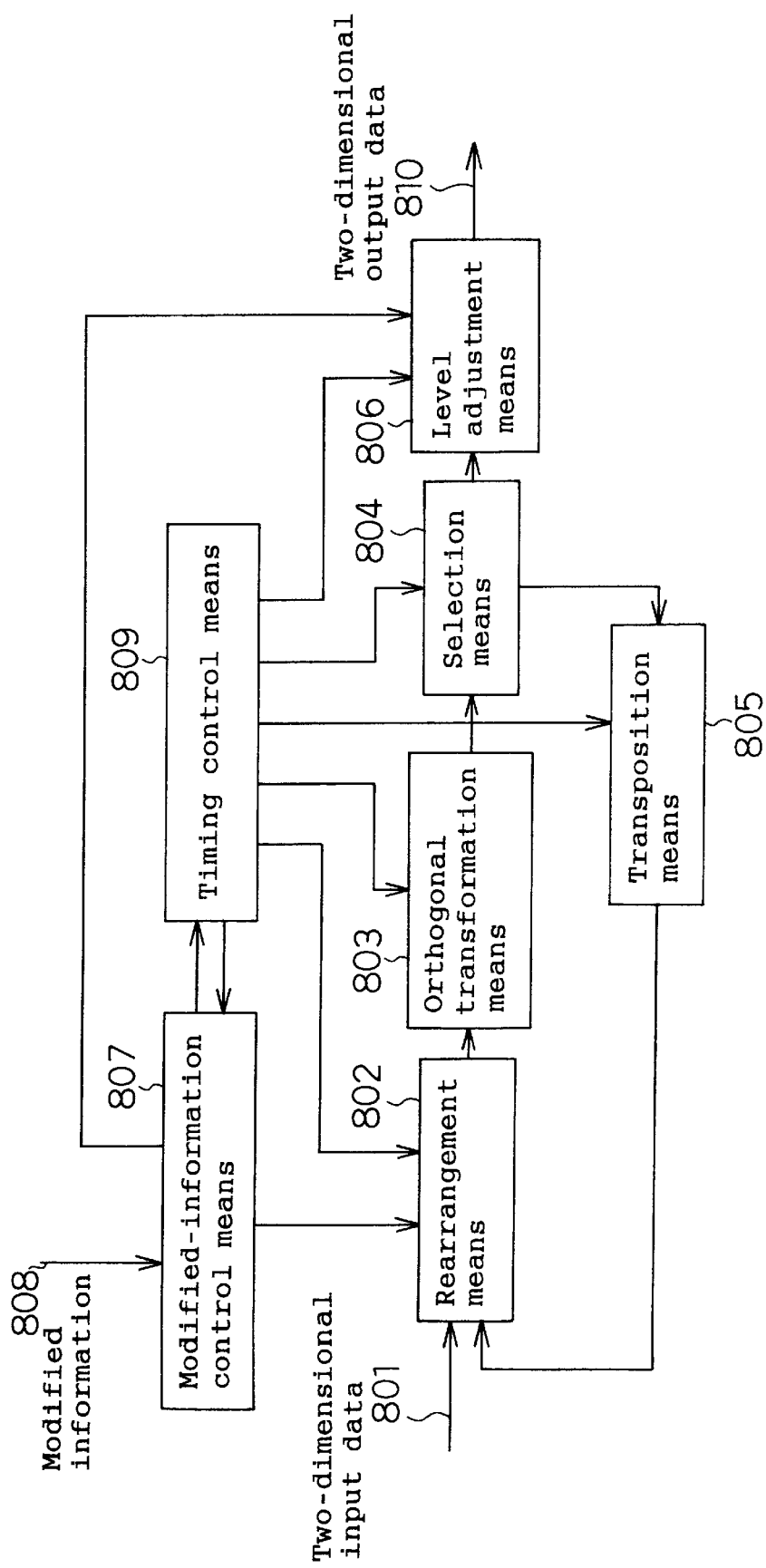
FIG. 8 is a block diagram showing the orthogonal transform apparatus of embodiment 4 of the present invention.
Figure 9:
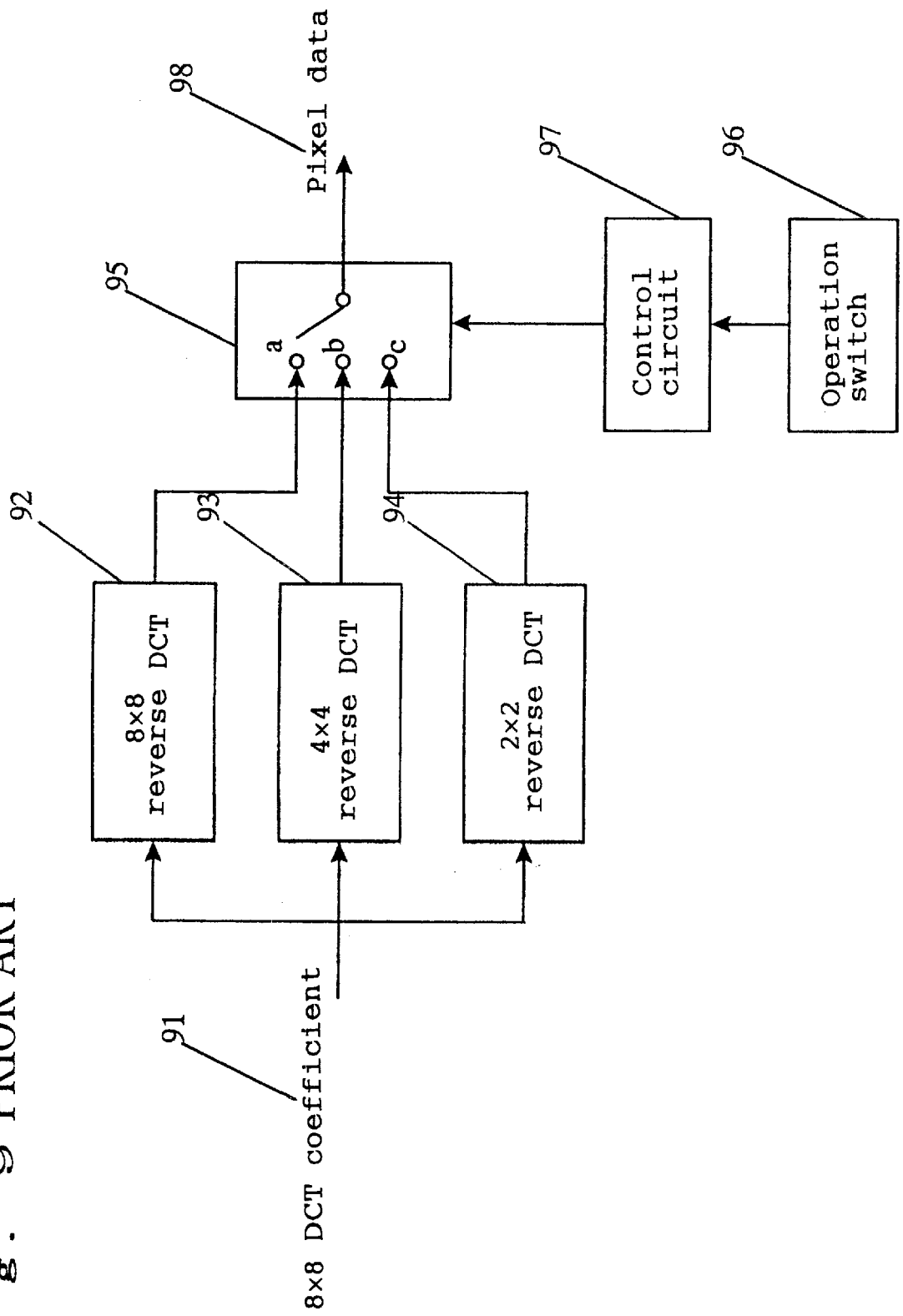
FIG. 9 is a block diagram showing a conventional orthogonal transform apparatus.
Figure 10:
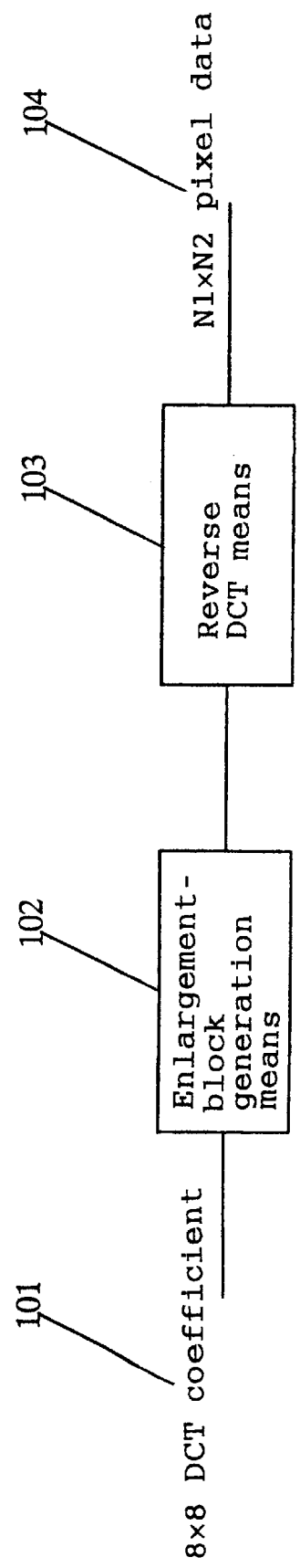
FIG. 10 is a block diagram showing a conventional orthogonal transform apparatus.

FIG. 8 is a block diagram showing the structure of the orthogonal transform apparatus for performing two-dimensional orthogonal transform. In FIG. 8, symbol 801 denotes two-dimensional input data, 802 denotes rearrangement means, 803 denotes orthogonal transform means, 804 denotes selection means, 805 denotes transposition means, 806 denotes level adjustment means, 807 denotes selection means, 808 denotes modified information, 809 denotes timing control means, and 810 denotes two-dimensional output data.

Hereafter, to simplify description, a case is described in which the orthogonal transform means 803 performs 8-order inverse DCT and the two-dimensional input data 801 consists of $2^k$ rows and $2^l$ columns (each of k and l is an integer of 0 to 3).

First, data values in the row direction of the two-dimensional input data 801 are rearranged by the rearrangement means 802 in accordance with the control information supplied from the modified-information control means 807 to set the data unnecessary for orthogonal transform to 0. In this case, the data values to be rearranged are one-dimensional $2^l$-order data values that are rearranged in accordance with FIGS. 2, 3, 4, and 5. The orthogonal transform means 803 applies one-dimensional 8-order inverse DCT to the data values rearranged in the row direction, the selection means 804 transfers the operation result to the transposition means 805, and the transposition means holds the result to transpose rows and columns of the result and output the result. The row-directional data values of the two-dimensional data whose rows and columns are transposed are rearranged by the rearrangement means 802 in accordance with the control information supplied from the modified-information control means 807 to set the data unnecessary for orthogonal transform to 0. In this case, the data to be rearranged is one-dimensional $2^k$-order data that is rearranged in accordance with FIGS. 2, 3, 4, and 5. Orthogonal transform means 803 applies one-dimensional 8-order inverse DCT the rearranged data, the selection means 804 transfers the operation result to the level adjustment means 806, and the level adjustment means 806 level-adjusts the result and thereby, the two-dimensional output data 810 can be obtained. Moreover, the modified-information control means 807 determines the rearrangement pattern of the rearrangement means 802, level adjustment value of the level adjustment means 806, and control information to be supplied to the timing control means 809 in accordance with the degrees of the two-dimensional input data 801 and two-dimensional output data 810 and the modified information 808 having the maximum degree which can be orthogonally transformed by the orthogonal transform means 803. Moreover, the timing control means 809 controls the input/output timing of the data in each means. Furthermore, the timing control means 809 controls which to compute, the two-dimensional input data 801 or the data output from the transposition means 803 or to which to transfer the operation result of the orthogonal transform means 803 by the selection means 804, the transposition means 805 or level adjustment means 806.

A case of obtaining 8-row 4-column output data from 8-row 4-column input data is specifically described below. In this case, row-directional data is quaternary data which is rearranged by the rearrangement means 802 as shown in FIG. 3(b) and the orthogonal transform means 803 applies first-time inverse DCT to the data. In this case, as shown in Table 1, it is necessary to multiply every data value output from the orthogonal transform means 803 by √2 in order to level-adjust the data. In this case, however, level adjustment is not performed but the data is transferred to the transposition means 805 by the selection means 804. The data not level-adjusted is transposed by the transposition means 805 and row-directional octal data is rearranged by the rearrangement means 802 as shown in FIG. 2(a) to apply second-time inverse DCT to the data. In this case, because inputs are octal (Table 1), it is unnecessary to perform level adjustment. The result of performing the second-time inverse DCT is transferred to the level adjustment means 806 by the selection means 804. The level adjustment means 806 adjusts a level by multiplying the data supplied from the selection means 804 by √2 which is a value obtained by multiplying a level adjustment value (√2-fold) necessary for the first-time inverse DCT by a level adjustment value (one-fold) necessary for the second-time inverse DCT. In this case, when considering the number of operation times, it is necessary to compute the quaternary data eight times in the case of the first-time inverse DCT. However, it is only necessary to compute octal data only four times in the case of the second-time inverse DCT. The timing control means 809 controls the number of operation times in accordance with the control information supplied from the modified-information control means 807 through each means.

The case of 8-row 4-column input data is described above. Moreover, in the case of other $2^k$-row $2^l$-column input data, it is possible to control the number of operation times by timing control means by similarly rearranging and level-adjusting the data.

Moreover, by using a inverse DCT coefficient including a level adjustment value for the orthogonal transform means 803, it is possible to form a structure for performing inverse DCT and level adjustment.

Furthermore, when the orthogonal transform means 803 constitutes one-dimensional inverse DCT at an optional degree, it is possible to perform inverse DCT if the degrees of dimensions of input and output are divisors of the maximum degree allowing inverse DCT to be performed.

Furthermore, though the case in which the orthogonal transform means 803 performs inverse DCT is described as an example, it is possible to form the same structure as the case of inverse DCT by performing rearrangement by the rearrangement means 802 in accordance with each transform, performing orthogonal transform by the orthogonal transform means 803, and performing level adjustment by the level adjustment means 806 in accordance with each transform for DCT, discrete sine transform, inverse discrete sine transform, discrete Fourier transform, or inverse discrete Fourier transform in accordance with each transform. Furthermore, when performing each orthogonal transform, it is possible to form a structure by using a fast algorithm.

As described above, the present invention makes it possible to enlarge and shrink a maximum-degree divisor capable of performing orthogonal transform as input/output data only by adding hardware for controlling rearrangement, level adjustment, and modified information to an apparatus for performing orthogonal transform.

Moreover, the present invention makes it possible to enlarge and shrink a maximum-degree divisor as input/output data only by changing coefficients of an apparatus for performing orthogonal transform and adding hardware for controlling rearrangement and modified information.

Furthermore, the present invention makes it possible to enlarge and shrink a maximum-degree divisor capable of performing orthogonal transform as input/output data only by adding hardware for controlling level adjustment and modified information to an apparatus for performing two-dimensional orthogonal transform and moreover, decrease the number of operation times in accordance with an input degree.

Furthermore, the present invention makes it possible to enlarge and shrink a maximum-degree divisor capable of performing orthogonal transform as input/output data only by adding hardware for controlling rearrangement, level adjustment, and modified information to an apparatus for performing two-dimensional orthogonal transform and moreover, decrease the number of operation times in accordance with an input degree.

It will be understood that a circuit of the present invention can be realized by hardware such as OR circuit, AND circuit which can exhibit their function as well as the function being realized by software programmed for a computer.

The present invention is also an information storing media which stores programs by which all or a part of the functions of the means, circuit of the present invention are realized on a computer.

What is claimed is:

1. An orthogonal transform apparatus comprising:
   orthogonal transform means for performing n-dimensional s-order (n and s are natural numbers) orthogonal transform, modified-information control means for performing control in accordance with modified information for outputting n-dimensional m-order data as n-dimensional p-order data (m and p are natural numbers), and rearrangement means for performing the following in accordance with the control by said modified-information control means:
   (1) m-p data values from the high-order side out of m-order input data values are set to 0 when m is equal to s and m is larger than p, p-m data values are added to the high-order side among m-order input data values to rearrange the data values when m is smaller than p, or data values are left as they are when m is equal to p;
   (2) the data values in said Item (1) are rearranged after discarding m-s data values from the high-order side of said m-order input data values before rearranging the data values in said Item (1) when m is larger than s; and
   (3) the data values in said Item (1) are rearranged after adding s-m 0 data values to the high-order side of said m-order input data values before rearranging the data values in said Item (1) when m is smaller than s; wherein
   said orthogonal transform means performs orthogonal transform for the n-dimensional s-order data values rearranged by said rearrangement means.

2. The orthogonal transform apparatus according to claim 1, further comprising level adjustment means for adjusting the level of data handled by said orthogonal transform means and/or the level of data output by said orthogonal transform means in accordance with said modified information.

3. The orthogonal transform apparatus according to claim 1, wherein said rearrangement means rearranges the p data values present at the low-order side among m-order input data values every s/p data values and generates s-order data by setting remaining data to 0.

4. The orthogonal transform apparatus according to claim 1, wherein p1, p2, ..., pn serve as divisors of s1, s2, ..., sn by assuming the degree p of the data after operation in each orthogonal transform as p1, p2, ..., pn when said orthogonal transform means combines n orthogonal transforms and performs n-dimensional orthogonal transform.

5. The orthogonal transform apparatus according to claim 1, wherein said modified-information control means determines level adjustment values by said level adjustment means as $\sqrt{s1}/\sqrt{m1}$, $\sqrt{s2}/\sqrt{m2}$, ..., $\sqrt{sn}/\sqrt{mn}$ by assuming the degree m of the input data for n orthogonal transforms as m1, m2, ..., mn.

6. The orthogonal transform apparatus according to claim 1, wherein said orthogonal transform means discrete-cosine-transforms, inverse-discrete-cosine-transforms, discrete-sine-transforms, inverse-discrete-sine-transforms, discrete-Fourier-transforms, or inverse-discrete-Fourier-transforms said n-dimensional m-order input data values rearranged by said rearrangement means.

7. An orthogonal transform apparatus comprising orthogonal transform means for performing the orthogonal transform of n-dimensional s-order (n and s are natural numbers), modified-information control means for performing control in accordance with the modified information for outputting n-dimensional m-order data as n-dimensional p-order data (m and p are natural numbers), and rearrangement means for performing the following in accordance with the control by said modified-information control means:
   (1) m-p data values from the high-order side out of m-order input data values are set to 0 when m is equal to s and m is larger than p, p-m data values are added to the high-order side among m-order input data values to rearrange the data values when m is smaller than p, or data values are left as they are when m is equal to p;
   (2) the data values in said Item (1) are rearranged after discarding m-s data values from the high-order side of said m-order input data values before rearranging the data values in said Item (1) when m is larger than s; and
   (3) the data values in said Item (1) are rearranged after adding s-m 0 data values to the high-order side of said m-order input data values before rearranging the data values in said Item (1) when m is smaller than s; wherein
   said orthogonal transform means performs orthogonal transform for the n-dimensional s-order data values rearranged by said rearrangement means and moreover, performs level adjustment for the data values.

8. The orthogonal transform apparatus according to claim 7, wherein said rearrangement means rearranges the p data values present at the low-order side among m-order input data values every s/p data values and generates s-order data by setting remaining data to 0.

9. The orthogonal transform apparatus according to claim 7, wherein p1, p2, ..., pn serve as divisors of s1, s2, ..., sn by assuming the degree p of the data after operation in each orthogonal transform as p1, p2, ..., pn when said orthogonal transform means combines n orthogonal transforms and performs n-dimensional orthogonal transform.

10. The orthogonal transform apparatus according to claim 7, wherein said modified-information control means determines level adjustment values as $\sqrt{s1}/\sqrt{m1}$, $\sqrt{s2}/\sqrt{m2}$, ..., $\sqrt{sn}/\sqrt{mn}$ by assuming the degree m of the input data for n orthogonal transforms as m1, m2, ..., mn and uses values obtained by multiplying all orthogonal transform coefficients of said orthogonal transform means by the level adjustment values as new orthogonal transform coefficients to perform orthogonal transform.

11. The orthogonal transform apparatus according to claim 7, wherein said orthogonal transform means discrete-cosine-transforms, inverse-discrete-cosine-transforms, discrete-sine-transforms, inverse-discrete-sine-transforms, discrete-Fourier-transforms, or inverse-discrete-Fourier-transforms said n-dimensional m-order input data values rearranged by said rearrangement means.

12. An orthogonal transform apparatus for two-dimensionally orthogonally transforming two-dimensional data of m1 rows and m2 columns into tow-dimensional data of p1 rows and p2 columns, comprising first orthogonal transform means for performing one-dimensional s1-order orthogonal transform, second orthogonal transform means for performing one-dimensional s2-order orthogonal transform, modified-information control means for performing control in accordance with modified information, and first rearrangement means for performing the following in accordance with the control by said modified-information control means:

(1) m1-p1 data values from the high-order side out of m1-order input data values are set to 0 when m1 is equal to s1 and m1 is larger than p1, p1-m1 data values are added to the high-order side among m1-order input data values to rearrange the data values when m1 is smaller than p1, or data values are left as they are when m1 is equal to p1;

(2) the data values in said Item (1) are rearranged after discarding m1-s1 data values from the high-order side of said m1-order input data values before rearranging the data values in said Item (1) when m1 is larger than s1; and (3) the data values in said Item (1) are rearranged after adding s1-m1 0 data values to the high-order side of said m1-order input data values before rearranging the data values in said Item (1) when m1 is smaller than s1; further comprising transposition means for holding data of s1 rows and m2 columns output from said first orthogonal transform means and second rearrangement means for performing the following:

(4) m2-p2 data values from the high-order side out of m2-order input data values are set to 0 when m2 is equal to s2 and m2 is larger than p2, p2-m2 data values are added to the high-order side among m2-order input data values to rearrange the data values when m2 is smaller than p2, or data values are left as they are when m2 is equal to p2;

(5) the data values in said Item (4) are rearranged after discarding m2-s2 data values from the high-order side of said m2-order input data values before rearranging the data values in said Item (4) when m2 is larger than s2; and (6) the data values in said Item (4) are rearranged after adding s2-m2 0 data values to the high-order side of said m2-order input data values before rearranging the data values in said Item (4) when m2 is smaller than s2; and further comprising timing control means for controlling the data input/output timing of each means; wherein said first and second orthogonal transform means apply orthogonal transform to the two-dimensional data of s1 rows and s2 columns rearranged by said first and second rearrangement means.

13. The orthogonal transform apparatus according to claim 12, further comprising level adjustment means for adjusting the level of data handled by said first and second orthogonal transform means and/or the level of data output by said orthogonal transform means in accordance with said modified information.

14. The orthogonal transform apparatus according to claim 12, wherein said first rearrangement means rearranges the p1 data values present at the low-order side among m1-order input data values every s1/p1 data values and generates s1-order data by setting remaining data to 0 and said second rearrangement means rearranges the p2 data values present at the low-order side among m2-order input data values every s2/p2 data values and generates s2-order data by setting remaining data to 0.

15. The orthogonal transform apparatus according to claim 12, wherein the degree p1 of the data output from said first orthogonal transform means is a divisor of s1 and the degree p2 of the data output from said second orthogonal transform means is a divisor of s2.

16. The orthogonal transform apparatus according to claim 12, wherein said modified-information control means determines the level adjustment values of said level adjustment means as $\sqrt{s1}/\sqrt{m1} \times \sqrt{s2}/\sqrt{m2}$.

17. The orthogonal transform apparatus according to claim 12, wherein said timing control means controls timing so that said first orthogonal transform means performs orthogonal transform by the data only for p2 columns from the low-order side of the m1-order data of m2 columns and the second orthogonal transform means performs orthogonal transform by the data only for p1 rows from the low-order side of the m2-order data of s1 rows.

18. The orthogonal transform apparatus according to claim 12, wherein said first and second orthogonal transform means discrete-cosine-transforms, inverse-discrete-cosine-transforms, discrete-sine-transforms, inverse-discrete-sine-transforms, discrete-Fourier-transforms, or inverse-discrete-Fourier-transforms said one-dimensional data values rearranged by said first or second rearrangement means.

19. An orthogonal transform apparatus for two-dimensionally orthogonally transforming two-dimensional data of m1 rows and m2 columns into two-dimensional data of p1 rows and p2 columns comprising: orthogonal transform means for performing one-dimensional s-order orthogonal transform, transposition means for holding the data output from said orthogonal transform means and transposing the data when output, selection means for outputting the output data of said orthogonal transform means or selectively supplying the output data to said transposition means, modified-information control means for performing control in accordance with modified information, and rearrangement means for performing the following in accordance with the control by said modified-information control means by setting m1 to m when the data to be rearranged is two-dimensional input data or setting m2 to m when the data to be rearranged is the output data of said transposition means:

(1) m-p data values from the high-order side out of m-order input data values are set to 0 when m is equal to s and m is larger than p, p-m data values are added to the high-order side among m-order input data values to rearrange the data values when m is smaller than p, or data values are left as they are when m is equal to p;

(2) the data values in said Item (1) are rearranged after discarding m-s data values from the high-order side of said m-order input data values before rearranging the data values in said Item (1) when m is larger than s; and (3) the data values in said Item (1) are rearranged after adding s-m 0 data values to the high-order side of said m-order input data values before rearranging the data values in said Item (1) when m is smaller than s; and further comprising timing control means for controlling the data input/output timing of each means; wherein said orthogonal transform means applies orthogonal transform to the one-dimensional s-order data values rearranged by said rearrangement means.

20. The orthogonal transform means according to claim 19, further comprising level adjustment means for adjusting the level of data handled by said orthogonal transform means and/or the level of data output by said orthogonal transform means in accordance with said modified information.

21. The orthogonal transform apparatus according to claim 19, wherein said rearrangement means rearranges the p1 data values present at the low-order side among m1-order input data values every s/p1 data values and generates s-order data by setting remaining data to 0 and moreover, rearranges the p2 data values present at the low-order side among m2-order input data values every s/p2 data values and generates s-order data by setting remaining data to 0.

22. The orthogonal transform apparatus according to claim 19, wherein the degrees p1 and p2 of the data values output from said orthogonal transform means are divisors of s.

23. The orthogonal transform apparatus according to claim 19, wherein said modified-information control means determines a level adjustment value of said level adjustment means in accordance with the arithmetic expression of $\sqrt{s}/\sqrt{m1} \times \sqrt{s}/\sqrt{m2}$.

24. The orthogonal transform apparatus according to claim 19, wherein said timing control means controls the timings for said rearrangement means to select and rearrange the two-dimensional input data and the two-dimensional data supplied from said transposition means, for said orthogonal transform means to perform orthogonal transform, and for said selection means to selectively supply transformed results to said level adjustment means or said transposition means.

25. The orthogonal transform apparatus according to claim 19, wherein said timing control means controls timing so that said orthogonal transform means orthogonally transforms the data of only p2 columns from the low-order side among the m1-order data of m2 columns and transposition means transposes the data of p2 columns and thereafter orthogonally transforms the data of only p1 columns from the low-order side among the m2-order data of s rows.

26. The orthogonal transform apparatus according to claim 19, wherein said orthogonal transform means discrete-cosine-transforms, inverse-discrete-cosine-transforms, discrete-sine-transforms, inverse-discrete-sine-transforms, discrete-Fourier-transforms, or inverse-discrete-Fourier-transforms said one-dimensional data rearranged by said rearrangement means.

27. In an orthogonal transform apparatus having an m-order array of pixel data values as input values and a p-order array of pixel data values as output values, a method for performing an s-order orthogonal transformation, wherein m, p and s are natural numbers, comprising the steps of:

(a) representing the m-order array of pixel data values as an m-order discrete cosine transform (DCT) coefficients;

(b) providing the m-order DCT coefficients as an input to the orthogonal transform apparatus;

(b) setting m-p data values to zero, if m is larger than p and m is equal to s;

(c) rearranging the m-order data values into p-order data values, after step (b) sets m-p data values to zero; and (d) performing an s-order inverse DCT using the p-order data values.

* * * * *